Jan. 31, 1967 W. TUTTLE 3,300,823
MOLD ASSEMBLY AND POURING METHOD AND APPARATUS
Filed March 1, 1965
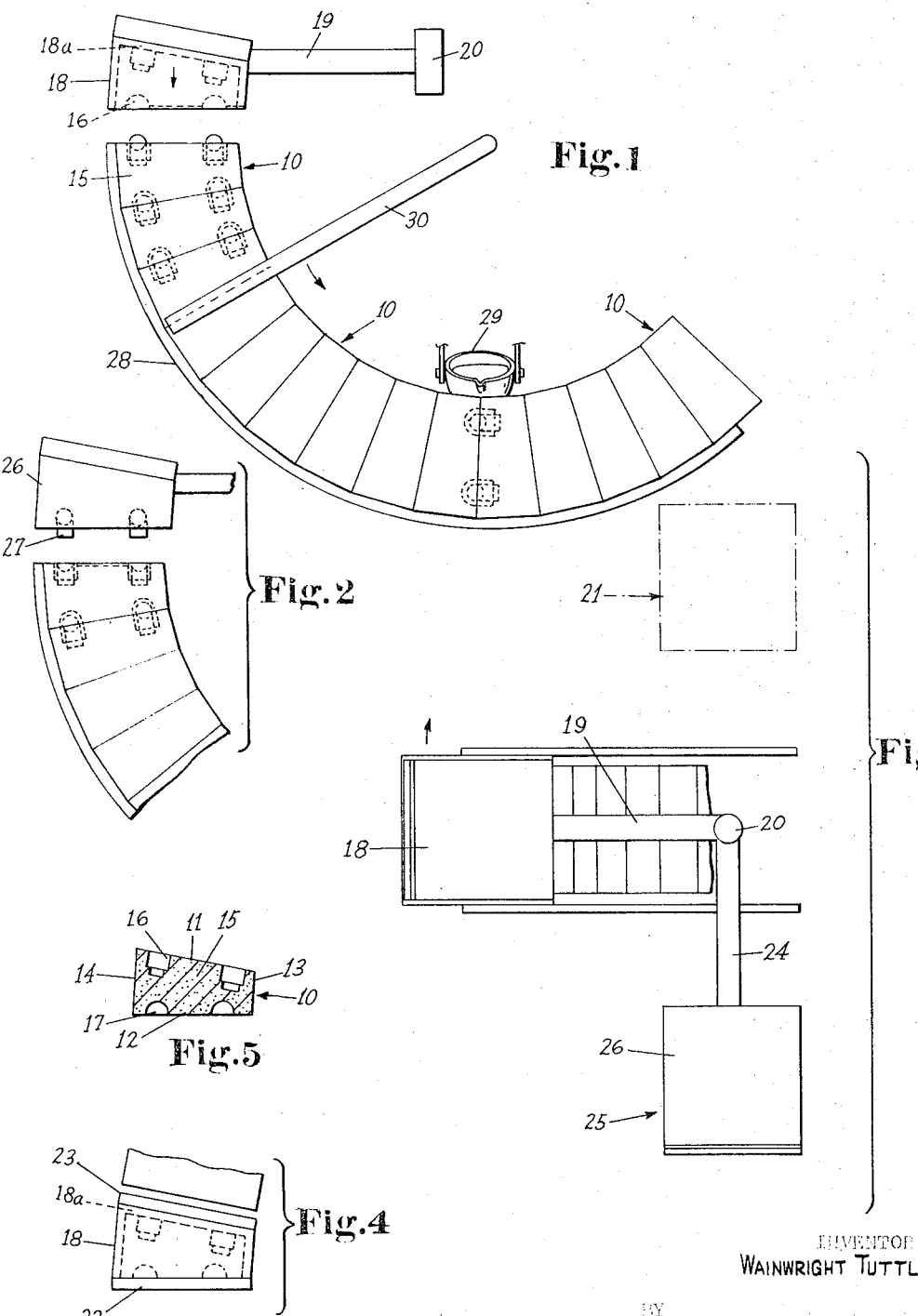
INVENTOR
WAINWRIGHT TUTTLE,
ATTORNEYS.

United States Patent Office 3,300,823
Patented Jan. 31, 1967

3,300,823
MOLD ASSEMBLY AND POURING METHOD
AND APPARATUS
Wainwright Tuttle, Cincinnati, Ohio, assignor to Altamil Corporation, Indianapolis, Ind., a corporation of Delaware
Filed Mar. 1, 1965, Ser. No. 436,050
17 Claims. (Cl. 22—130)

This invention relates broadly to foundry practice, and specifically to an improved method and apparatus for assemblying and pouring of molds. This application also discloses an improved design for a mold, by means of which the method aspect of this invention can be carried out.

According to conventional practice, a completed mold cavity usually requires two mating mold parts, each part containing a portion of the cavity. If the article being produced does not require a passage or other opening therethrough, the mold parts are assembled, and the cavity is filled with molten metal or other molding material, which, when solidified and removed from the mold, results in the desired product.

Molding of hollow objects requires the use of a core set in the mold cavity. Ordinarily, the hardened core of sand and the like is set in the core print or prints in one of the mold parts. The mating mold part is then placed in position to complete the mold. One embodiment of automatic core setting has been taught in copending applications, Serial No. 179,960 entitled Automatic Mold Preparing Apparatus, now U.S. Patent No. 3,181,207 and Serial No. 263,156 entitled, Method for the Use of Dynamic Vacuum in Foundry Operation, now U.S. Patent No. 3,181,213.

It will be obvious to the skilled worker in the art that secure clamping or holding together of the mold parts during pouring is necessary to prevent loss of the molten metal along the parting surface between the mold parts. This is usually accomplished by retaining the mold parts in flasks, and mechanically clamping the flasks together.

According to a relatively recent development, it is possible to provide a mold formed of sand or other moldable material and having matching portions of a desired cavity in the opposite faces of the mold part, so that when a plurality of these "double faced molds" are placed in a continuous line, there will be a complete set of cavities between adjacent molds. It is also common in developments of this character to utilize a continuous conveyor, into which empty molds are introduced at one end and from which filled molds are discharged at the other end, the filling or pouring of the mold cavities taking place at a predetermined station along the conveyor. The clamping force utilized in such a system to hold the mold parts together against run-out of metal is provided by the friction of the mold edge on the conveyor, accumulating from mold to mold to the pouring and solidification area.

While such systems have many desirable aspects, it is characteristic of all of them that the molds are formed in a generally vertical orientation, and remain vertical throughout the system. This makes it extremely difficult to set separately formed cores in the mold cavities, and to effect the subsequent closure of the mold without having the cores shift or fall out.

Keeping the above discussion in mind, it is a principal object of this invention to provide a method whereby a continuous line of molds begins with the molds oriented horizontally to facilitate automatic core setting as described in the co-pending applications referred to above.

It is a further object of this invention to provide a method whereby a mold with mating cavities in its opposite faces may be extracted, and transported to the continuous line of molds, placed on top of the previous molds, in the manner taught in the aforementioned pending applications.

It is a further object of this invention to provide a method whereby the weight of molds in the continuous line above the pouring point provides a heavy clamping force to prevent run-out of molding material and provide a high degree of accuracy in the castings.

It is a further object of this invention to provide a method whereby the continuous line of molds reaches a point where they are steeply slanted or vertically oriented so that they can be poured with molten metal or the like through a sprue hole at the top of the parting line.

Still another object of this invention is to permit removal of cooled molds from the end of the continuous line of molds without disturbing those following nor reducing the force holding the molds together in the pouring and solidification areas.

Numerous other objects and advantages of this invention will become apparent upon a careful examination of this specification. An exemplary embodiment of the invention will now be described in detail, with reference to the accompanying drawings, in which:

FIGURE 1 shows a plurality of mold parts arranged in a continuous line, showing a mold, with cores already set, about to be closed;

FIGURE 2 is a view of a portion of the component shown in FIGURE 1, showing a plurality of cores about to be set in the mold;

FIGURE 3 shows diagrammatically the preferred arrangement of components of this invention in plan view;

FIGURE 4 shows diagrammatically an apparatus for shooting and gassing sand molds; and FIGURE 5 is a cross sectional view through a mold according to this invention.

Briefly considered, this invention contemplates the stacking of a plurality of double faced molds in a continuous, vertical arc. This vertical arc is of such an extent that the molds at one end of the arc are substantially horizontal, so that automatic core setting or other handling of mold parts may be carried out as taught in the co-pending applications referred to above. At still another point in the vertical arc, the mold parts will be substantially vertically oriented, so that pouring with molten metal may be accomplished in the conventional manner.

It should be apparent that a novel mold part is required in order to carry out the invention briefly described above. That is, opposite faces of the mold part must be non-parallel, so that when a plurality of such molds are arranged in surface contacting relationship, they will provide the arcuate configuration indicated in the drawings.

Referring now to the drawings, and particularly to FIGURE 5, the improved mold for use with the method and apparatus of this invention has been shown in cross-section. The mold itself comprises a generally rectangular body 10 of moldable material. The particular embodiment described hereinafter deals with the use of sand and a binder, hardened by a chemical reaction brought about when carbon dioxide gas under pressure is introduced into the sand composition. It will of course be understood that any other of the conventional mold forming materials may be used within the scope of this invention. The mold 10 includes the top and bottom surfaces 11 and 12 respectively, the front surface 13, the back surface 14, and a pair of identical side surfaces 15. It will be apparent that the back surface 14 is somewhat larger than the front surface 13, whereby the opposed top and bottom surfaces of the mold are non-parallel. The top and bottom surfaces 11 and 12 of the mold are provided with mating cavity impressions 16 and 17. In the embodiment shown, the cavities are designed for the production of a T fitting. As will be seen in FIGURES 1 and 2, when a plurality of molds such as indicated above are placed in a continuous line, there will be a complete set of cavities between adjacent molds.

As indicated earlier in this specification, double faced molds in and of themselves are old and well known. However, as also indicated above, the mold of this invention includes non-parallel top and bottom surfaces. This is one of the central facets of this invention. As is clearly apparent in FIGURE 1, a plurality of molds may be stacked with the bottom surface of one mold in contact with the top surface of the adjacent mold, and by virtue of the non-parallel relation between the top and bottom surfaces, the molds so stacked will describe a vertical arc. In the drawing, the proportions have been greatly exaggerated for clarity. In actual practice, for a mold 18 by 24 inches, by approximately 9 inches thick, the radius of the arc would be about 15 feet, and the angle of the top and bottom surfaces to each other would be on the order of 3 degrees.

The production of molds as such does not constitute a part of this invention. By way of brief description, each of the molds is formed in a mold box 18 having an upper pattern plate 18a integral therewith. The mold box 18 will be suitably secured as described hereinafter to a supporting arm 19, which is pivotally mounted on the standard 20, and which may be raised and lowered with respect thereto.

In FIGURE 3, a mold shooting station is diagrammatically indicated at 21. At this station, the mold box 18 is placed over a lower pattern plate 22 (see FIGURE 4) and the enclosed mold box is filled with sand by any known device. When the mold box is filled with sand, the sand may be hardened by passing carbon dioxide gas under pressure through the mold, via the gassing plate 23. (It will be noted that both shooting with sand and gassing in this embodiment take place through the upper pattern plate 18a.)

When the mold is hardened, the lower pattern plate 22 is removed, preferably, by lowering the lower pattern plate while the supporting arm 19 and the mold box 18 remain adjacent the shoot head. The mold will be retained in the mold box 18 by the use of dynamic vacuum as described and claimed in the co-pending application referred to earlier.

The supporting arm 19 is then pivoted around the standard 20, bringing it to the position indicated in FIGURES 1 and 3. At this point, the mold box 18 containing a hardened mold is lowered on to the arcuate stack of prior formed molds. Air under pressure is then introduced to the interface between the mold and upper pattern 18a, and the mold box 18 is raised, leaving the completed mold in position on the arcuate stack. It will be apparent to the skilled worker in the art that the means for raising the mold box during extraction of the hardened mold must have a horizontal freedom of motion in the plane of the arc during its rise. This permits the mold to be withdrawn on the slight angle which the upper face of the mold bears to the lower face.

While the mold box 18 and supporting arm 19 are in a position indicated in FIGURE 1, a second supporting arm 24 will be in the position indicated in FIGURE 3. This supporting arm 24 carries a core box part on its outer end, and it will be seen that this core box part is now presented to a core shooting station 25. It will be understood that horizontal freedom of movement must be provided in order to facilitate core setting. Formation of cores in the core box will be carried on according to well known practice in the art. When the cores have been hardened, the core box bottom is lowered (similar to withdrawal of the lower pattern plate 22) and the cores will remain embedded in and partially projecting from the core box top 26, as shown in FIGURE 2. It will be recognized by the skilled worker in the art that for certain castings, the cores should be ejected from the corebox top, the cores then being embedded in and partially projecting from the corebox bottom. In such a case, means must be provided to roll the corebox bottom over during transit to the core setting position; such a system is disclosed in U.S. Patent No. 3,181,207. At this time, the core box supporting arm 24 is lowered, to seat the cores 27 in the core prints of the mold 10. The seated cores are then ejected from the core box top 26 by any suitable means, certain embodiments of which are described in more detail in the aforesaid co-pending applications. While the cores 27 are being set, the supporting arm 19 and mold box 18 have been returned to the mold shooting station 21. Thus, the process constitutes the sequential formation of a mold and a plurality of cores therefor, these elements being sequentially traversed to an assembly station.

At this assembly station is provided a guide track 28 which describes a vertical arc. It is on this guide track that the sequentially formed molds are stacked in the manner indicated above. By referring to FIGURE 1, it will be seen that one end of the guide track 28 (and one end of the arcuate stack of molds) lies substantially on a horizontal radius of the arc. This means that the upper surface of the last formed mold will be horizontal, so that automatic core setting is easily accomplished. It will also be seen that at substantially the bottom of the arc, the parting surface between adjacent molds is substantially vertical. At this time, the mold cavities may be filled with molten metal as schematically indicated by the ladle 29. As is recognized in the art, pouring molds through a sprue hole formed in the parting surfaces between mold parts presents certain advantages. The above described method and apparatus, therefore, permits horizontal orientation of molds for core setting, and also permits vertical orientation for molds for pouring.

As each additionally formed mold is added to the vertical arc, means must be provided for moving the entire stack one unit length. In the preferred embodiment of the invention, the unbalanced weight of molds in the vertical arc is carefully balanced with respect to friction between the molds and the guide track, so that under the application of a relatively light force, the molds can be made to intermittently move one unit length about the arc. This may be accomplished by means of the indexer 30 which has been only schematically illustrated. It will be understood that the indexer is designed for generally rectangular motion. That is, it will move in the direction indicated by the arrow to advance the molds about the arc one unit length; the indexer then withdraws inward toward the center of the arc, goes back one unit length, and then goes outward to engage the next mold. To this end, each mold may be formed with either a slight projection, or indentation on its side surfaces, by means of which the indexer 30 can engage the mold.

As the molds progress around the arc, past the pouring position, they will reach the end of the guide track 28, at which time the molds will fall off (or be mechanically picked off) to a conventional shake out station, where the finished product is removed from the sand or other mold forming material.

Numerous modifications can be made in this invention without departing from its scope and spirit. For example, there are a large number of possibilities by means of which the vertically stacked molds can be intermittently moved one unit length. For example, the guide track 28 can be provided with a flexible chain driven intermittently by a suitable motor. On the other hand, the unbalanced weight of molds in the vertical arc can be regulated with respect to friction so that the weight of the molds themselves will be sufficient to move the entire stack one unit length. It will, of course, be understood that in this last mentioned embodiment, suitable means must be provided to prevent the entire stack from moving too far. Such means could simply be a releasable stop or the like, such as a step at the end of the track. It is also contemplated that the downward force involved in the core setting action can be used to move the entire stack of molds.

The embodiments of the invention in which an exclusive property or privilege is claimed are defined as follows:

1. A double faced mold section comprising a generally rectangular body having top and bottom surfaces, a front surface parallel to a larger back surface, whereby said top and bottom surfaces form substantially the same acute angle with said front surface, and a pair of substantially flat side surfaces, said top and bottom surfaces including casting cavity impressions.

2. At least two mold sections according to claim 1 arranged with said top surface of one of said mold sections in contact with said bottom surface of the other of said mold sections, and defining a mold cavity therebetween for the reception of molten material.

3. The arrangement of claim 2 including a plurality of additional mold sections, all of said mold sections being arranged in a vertical arc of at least 90 degrees.

4. The arrangement of claim 3 wherein said vertical arc extends at least 90 degrees but less than 180 degrees.

5. A double faced mold comprising a body of mold forming material having top and bottom surfaces with mating cavity impressions therein, said top and bottom surfaces forming substantially the same acute angle with a common surface, whereby a plurality of said molds arranged with the top surface of one mold contiguous with the bottom surface of another mold describe an arc.

6. A mold assembly and pouring apparatus comprising guide means in the form of a vertical arc for supporting double faced molds, means for controlling movement of molds along said guide means, whereby double faced molds stacked continuously in face-to-face contact on said guide means are caused to traverse an angle of at least 90°.

7. The apparatus of claim 6 wherein said vertical arc of said guide means extends through at least 90 degrees but less than 180 degrees, one end of said guide means lying substantially on a horizontal radius of said arc.

8. The apparatus claimed in claim 7 wherein said means for moving said molds is arranged for intermittent operation.

9. The apparatus claimed in claim 8 wherein said intermittent means for moving said molds comprises the unbalanced weight of said molds on said guide means, and means for intermittently permitting said molds to move under the influence of gravity.

10. The apparatus claimed in claim 8 wherein said intermittent means for moving said molds comprises means operative intermittently to push said plurality of molds along said arcuate guide means one unit length.

11. The apparatus claimed in claim 10 wherein said means operative to push said molds comprises an indexing member releasably engaging one of said molds.

12. The apparatus claimed in claim 10 wherein said means operative to push said molds comprises flexible means associated with said guide means, said flexible means engaging at least one of said molds, and means for moving said flexible means.

13. In a molding process wherein cores are set in a mold cavity while said mold is horizontally oriented, and molten material is introduced into said mold cavity when said mold is oriented to receive molten material, the improvement which comprises the step of forming a continuous stack of molds in a vertical arc of at least 90 degrees from the core setting to the solidification of molten material.

14. The process claimed in claim 13 wherein one end of said arc lies substantially on a horizontal radius of said arc.

15. The process claimed in claim 14 wherein said arc is at least 90 degrees, but less than 180 degrees.

16. A molding process including the steps forming a plurality of molds having non-parallel top and bottom surfaces, sequentially transporting said molds in a generally horizontal orientation to an assembly station, stacking said molds in a vertical arc of at least 90 degrees at said assembly station, and filling said molds with molten material when said molds in said vertical arc are generally vertically oriented.

17. The process claimed in claim 16 including the steps of forming additional molds, transporting said additional molds to said vertical arc at said assembly station, and removing a filled mold from the other end of said vertical arc.

References Cited by the Examiner

UNITED STATES PATENTS

| | | | |
|---|---|---|---|
| 1,229,873 | 6/1917 | Bowers | 249—126 X |
| 1,350,352 | 8/1920 | Anderson | 22—63 X |
| 1,758,823 | 5/1930 | Blage | 249—117 |
| 2,607,978 | 8/1952 | Ward | 22—131 X |
| 2,769,217 | 11/1956 | Davis | 22—21 |
| 2,804,664 | 9/1957 | Brennan. | |

J. SPENCER OVERHOLSER, *Primary Examiner.*

E. MAR, *Assistant Examiner.*